(12) United States Patent
Campbell et al.

(10) Patent No.: US 9,587,168 B2
(45) Date of Patent: Mar. 7, 2017

(54) ALKYLAROMATIC SULFONATES FOR ENHANCED OIL RECOVERY PROCESS

(71) Applicants: Curt B. Campbell, San Ramon, CA (US); Andrew Howes, San Ramon, CA (US); Terri Denslow, San Ramon, CA (US)

(72) Inventors: Curt B. Campbell, San Ramon, CA (US); Andrew Howes, San Ramon, CA (US); Terri Denslow, San Ramon, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 318 days.

(21) Appl. No.: 14/039,377

(22) Filed: Sep. 27, 2013

(65) Prior Publication Data

US 2014/0090838 A1    Apr. 3, 2014

Related U.S. Application Data

(60) Provisional application No. 61/707,116, filed on Sep. 28, 2012.

(51) Int. Cl.
*C09K 8/584* (2006.01)
*E21B 43/16* (2006.01)

(52) U.S. Cl.
CPC .............. *C09K 8/584* (2013.01); *E21B 43/16* (2013.01)

(58) Field of Classification Search
None
See application file for complete search history.

(56) References Cited

U.S. PATENT DOCUMENTS

| | | | |
|---|---|---|---|
| 4,608,204 A | 8/1986 | Lew et al. | |
| 6,269,881 B1 | 8/2001 | Chou et al. | |
| 6,989,355 B1 | 1/2006 | Campbell et al. | |
| 7,332,460 B2 | 2/2008 | Campbell et al. | |
| 7,449,596 B2 | 11/2008 | Campbell et al. | |
| 7,468,343 B2 | 12/2008 | Campbell et al. | |
| 7,495,140 B2 | 2/2009 | Campbell et al. | |
| 2005/0199395 A1 | 9/2005 | Berger et al. | |
| 2006/0014650 A1* | 1/2006 | Campbell | C09K 8/584 507/259 |
| 2006/0058199 A1 | 3/2006 | Berger et al. | |
| 2007/0142665 A1* | 6/2007 | Campbell | C07C 303/06 562/33 |
| 2007/0282125 A1 | 12/2007 | Campbell et al. | |
| 2008/0113884 A1* | 5/2008 | Campbell | C09K 8/584 507/259 |
| 2009/0018359 A1 | 1/2009 | Campbell et al. | |

FOREIGN PATENT DOCUMENTS

| | | |
|---|---|---|
| EP | 0 111 354 | 6/1984 |
| EP | 0 413 374 | 2/1991 |
| WO | 2009/079289 | 6/2009 |
| WO | 2009/085964 | 7/2009 |

OTHER PUBLICATIONS

The European Search Report issued in European Patent Application No. 13840938 dated Sep. 8, 2015.
Jackson, Adam, C., Masters Thesis, University of Austin at Austin, Texas (Dec. 2006) "Experimental Study of the Benefits of Sodium Carbonate on Surfactants for Enhanced Oil Recovery".
The International Search Report issued in International Patent Application No. PCT/US2013/062305 dated Feb. 10, 2014.

* cited by examiner

*Primary Examiner* — Jeffrey Washville
(74) *Attorney, Agent, or Firm* — Ryan, Mason & Lewis, LLP

(57) ABSTRACT

An alkylaromatic sulfonate is disclosed wherein the alkyl group contains a distribution of alkyl chain lengths which comprise greater than 15 weight percent and up to about 35 weight percent of $C_{30}$ to $C_{58}$. Also disclosed is a process for preparing an alkylaromatic sulfonate and its use in recovering crude oil from a subterranean hydrocarbon containing formation.

26 Claims, No Drawings

ALKYLAROMATIC SULFONATES FOR ENHANCED OIL RECOVERY PROCESS

PRIORITY

This application claims the benefit under 35 U.S.C. §119 to U.S. Provisional Patent Application No. 61/707,116, filed on Sep. 28, 2012, the contents of which are incorporated by reference herein.

BACKGROUND OF THE INVENTION

1. Technical Field

The present invention is directed to alkylaromatic sulfonates for enhanced oil recovery processes.

2. Description of the Related Art

Crude oil production from oil in subterranean reservoirs may involve use of various flooding methods as the natural forces that are used in the "primary recovery" process become depleted. A large portion of the crude oil may have to be driven out of the formation in "secondary" or "tertiary" recovery processes. In addition, some reservoirs may not have sufficient natural forces for oil production even by primary recovery processes. The production of crude oil using such flooding methods is one example of enhanced oil recovery process.

One trend in the petroleum industry now is to plan exploitation of the oil field at the beginning of the project. Injecting a displacing fluid or gas may begin early, long before the complete depletion of the field by primary recovery processes. Methods for improving displacement efficiency or sweep efficiency may be used at the very beginning of the first injection of a displacing fluid or gas, rather than under secondary and tertiary recovery conditions.

The least expensive and easiest method of flooding a subterranean reservoir 2 for the production of crude oil is by injecting a liquid or a gas into the well to force the oil to the surface. Water flooding is the most widely used fluid. However, water does not readily displace oil because of the immiscibility of water and oil and/or the high interfacial tension between the two liquids.

The addition of chemicals to modify the properties of the flooding liquid is well known in the art. Surfactants are one class of chemical compounds that have been used in aqueous media for enhanced oil recovery. Surfactants have been found to effectively lower the interfacial tension between oil and water and enabling the oil droplets to flow more easily through the channels of the reservoir.

Alkylaryl sulfonates have been used as surfactants for enhanced oil recovery. They have been used in surfactant flooding, alone, or in conjunction with co-surfactants and/or sacrificial agents. Alkylaryl sulfonates are generally used not only because they are able to lower the interfacial tension between oil and water, but also because when used in conjunction with varying amounts of sodium chloride they exhibit different phase behavior. At low salinity, alkylaryl sulfonates can have a tendency to stay in the aqueous phase, but at high salinity they tend to stay in the oil phase. Around mid-point salinity, a micro-emulsion forms in which appreciable amounts of oil and brine are in the micro-emulsion phase. It is at this mid-point salinity that the surfactant exhibits high oil recovery potential. The salinity of the water in subterranean hydrocarbon reservoirs may vary a great deal, for example, the Minas oil field in Indonesia has total dissolved salts of between 0.2 and 0.7 weight percent. Other reservoirs may have salinities as high as or higher than 2.0 percent sodium chloride and over 0.5 percent calcium chloride and magnesium chloride. It is desirable to optimize the alkylaryl sulfonates for surfactant flooding for enhanced oil recovery for a particular reservoir by determining the interfacial tension of the reservoir oil in an aqueous brine solution containing the alkylaryl sulfonates which matches the salinity of the reservoir water.

Generally, pure alkylaryl sulfonates, that is, those having a narrow range of molecular weights, are useful for recovery of light crude oils. Such alkylaryl sulfonates have been less useful for enhancing oil recovery of crude oils containing high wax content. Alkylaryl sulfonates having a broad spectrum of carbon chain lengths in the alkyl group are more desirable for use to recover waxy crude oils.

U.S. Pat. No. 6,989,355 discloses an under-neutralized alkyl-xylene sulfonic acid composition which contains a mixture of alkylated xylene sulfonic acids.

U.S. Pat. Nos. 7,332,460 and 7,468,343 disclose alkylxylene sulfonates and a method for recovering crude oil from a subterranean hydrocarbon containing formation using the alkylxylene sulfonates. The alkylxylene moiety in the alkylxylene sulfonate disclosed therein contains a high percentage of the 4-alkyl-1,2-dimethyl benzene isomer and a high percentage of alkyl group attachment to the xylene ring at positions higher than the 2-position on the alkyl carbon chain. In addition, the alkyl chain lengths comprise from about 40 to about 80 percent $C_{12}$ to $C_{20}$ and about 5 percent to about 15 percent of $C_{32}$ to $C_{58}$.

U.S. Pat. No. 7,495,140 ("the '140 patent") discloses a process for alkylating an aromatic compound comprising (a) reacting a first amount of at least one aromatic compound with an amount of a mixture of olefins selected from olefins having from about 8 to about 100 carbon atoms, in the presence of a strong acid catalyst; and (b) reacting the product of (a) with an additional amount of at least one aromatic compound and an additional amount of a strong acid catalyst and, optionally, with an additional amount of a mixture of olefins selected from olefins having from about 8 to about 100 carbon atoms, wherein the resulting product comprises at least about 80 weight percent of a 1,2,4 tri-alkylsubstituted aromatic compound. Examples 1-3 of the '140 patent disclose alkylating o-xylene with a mixture of $C_{14}$ to $C_{30+}$ normal α-olefins wherein the mixture contained 8 wt. % $C_{30+}$ olefins.

U.S. Pat. No. 7,449,596 discloses a process for preparing a synthetic petroleum sulfonate comprising (a) reacting at least one aromatic compound with a mixture of olefins selected from olefins having from about 8 to about 100 carbon atoms, wherein the mixture of olefins contains a distribution of carbon atoms that comprise from about 4 percent to about 15 percent $C_{32}$ to $C_{58}$, in the presence of an acidic ionic liquid catalyst, wherein the resulting product comprises at least about 50 weight percent of a 1, 2, 4 tri-substituted aromatic compound or a 1, 2, 3 tri-substituted aromatic compound or mixtures thereof; (b) reacting the product of (a) with sulfur trioxide, which has been diluted with air; and (c) neutralizing the product of (b) with an alkali or alkaline earth metal hydroxide.

It would be desirable to provide improved alkylaromatic sulfonates for enhanced oil recovery processes.

SUMMARY OF THE INVENTION

In accordance with one embodiment of the present invention, there is provided an alkylaromatic sulfonate wherein the alkyl group contains a distribution of alkyl chain lengths which comprise greater than 15 weight percent and up to about 35 weight percent of $C_{30}$ to $C_{58}$.

In accordance with a second embodiment of the present invention, there is provided an alkylaromatic sulfonate prepared by a process comprising:

(a) reacting at least one aromatic compound with a mixture of olefins selected from olefins having from about 8 to about 100 carbon atoms, wherein the mixture of olefins contains a distribution of carbon atoms that comprise from greater than 15 weight percent and up to about 23 weight percent $C_{30}$ to $C_{58}$, in the presence of an acidic alkylation catalyst;

(b) sulfonating the product of step (a); and (c) neutralizing the sulfonated product of step (b) with an alkali or alkaline earth metal hydroxide, wherein the resulting alkylaromatic sulfonate possesses an alkyl group containing a distribution of alkyl chain lengths which comprise greater than 15 weight percent and up to about 35 weight percent of $C_{30}$ to $C_{58}$.

In accordance with a third embodiment of the present invention, there is provided a process for preparing an alkylaromatic sulfonate, the process comprising reacting at least one aromatic compound with a mixture of olefins selected from olefins having from about 8 to about 100 carbon atoms, wherein the mixture of olefins contains a distribution of carbon atoms that comprise from greater than 15 weight percent and up to about 23 weight percent $C_{30}$ to $C_{58}$, in the presence of an acidic alkylation catalyst; (b) sulfonating the product of step (a); and (c) neutralizing the sulfonated product of step (b) with an alkali or alkaline earth metal hydroxide to provide an alkylaromatic sulfonate wherein the alkyl group contains a distribution of alkyl chain lengths which comprise greater than 15 weight percent and up to about 35 weight percent of $C_{30}$ to $C_{58}$.

In accordance with a fourth embodiment of the present invention, there is provided a method for recovering crude oil from a subterranean hydrocarbon containing formation, the method comprising:

(a) injecting into the formation an aqueous solution containing an amount of one or more alkylaromatic sulfonates or a mixture of alkylaromatic sulfonates effective for the recovery of crude oil wherein the alkyl group of alkylaromatic sulfonate contains a distribution of alkyl chain lengths which comprise greater than 15 weight percent up to about 35 weight percent of $C_{30}$ to $C_{58}$; and (b) displacing the crude oil with the aqueous solution injected into the formation to thereby recover hydrocarbons from a production well.

Among other factors, the present invention is based on the surprising discovery that alkylaromatic sulfonates wherein the alkyl group contains a distribution of alkyl chain lengths which comprise greater than 15 weight percent up to about 35 weight percent of $C_{30}$ to $C_{58}$ allows for a more consistent oil solubilization parameter thereby resulting in improved enhanced oil recovery.

DETAILED DESCRIPTION OF THE PREFERRED EMBODIMENTS

To facilitate the understanding of the subject matter disclosed herein, a number of terms, abbreviations or other shorthand as used herein are defined below. Any term, abbreviation or shorthand not defined is understood to have the ordinary meaning used by a skilled artisan contemporaneous with the submission of this application.

Olefins—The term "olefins" refers to a class of unsaturated aliphatic hydrocarbons having one or more carbon-carbon double bonds, obtained by a number of processes. Those containing one double bond are called mono-alkenes, and those with two double bonds are called dienes, alkyldienes, or diolefins. Alpha olefins are particularly reactive because the double bond is between the first and second carbons. Examples are 1-octene and 1-octadecene, which are used as the starting point for medium-biodegradable surfactants. Linear and branched olefins are also included in the definition of olefins.

Linear Olefins—The term "linear olefins," which include normal alpha olefins and linear alpha olefins, refers to olefins which are straight chain, non-branched hydrocarbons with at least one carbon-carbon doable bond present in the chain.

Partially Branched Linear Olefins—The term "partially branched linear olefins" refers to a class of linear olefins comprising less than one alkyl branch per straight chain containing the double bond, wherein the alkyl branch may be a methyl group or higher. Partially branched linear olefins may also contain double-bond isomerized olefin.

Branched Olefins—The term "branched olefins" refers to a class of olefins comprising one or more alkyl branches per linear straight chain containing the double bond, wherein the alkyl branch may be a methyl group or higher.

Double-Bond isomerized linear Olefins—The term "double-bond isomerized linear olefins" refers to a class of linear olefins comprising more than 5% of olefins in which the carbon-carbon double bond is not terminal (i.e., the double bond is not located between the first and second carbon atoms of the chain).

$C_{12}$-$C_{30+}$ Normal Alpha Olefins—This term defines a fraction of normal alpha olefins wherein the carbon numbers below 12 are not present, either by distillation or other fractionation methods or blending.

The terms "enhanced oil recovery" or "EOR" as used herein refer to processes for enhancing the recovery of hydrocarbons from subterranean reservoirs. Techniques for improving displacement efficiency or sweep efficiency may be used for the exploitation of an oil field by introducing displacing fluids or gas into injection wells to drive oil through the reservoir to producing wells. The term "neutralized" as used herein refers to alkylxylene sulfonic acid neutralized with an inorganic or an organic base, such as an alkali metal hydroxide, oxide and/or alkoxide, ammonia, an organic amine or an alkanol amine.

The terms "optimum salinity" or "midpoint salinity" as used herein refer to the amount of salt in the aqueous phase required to minimize the interfacial tension and maximize the recovery of oil.

The term "waxy crude oil" as used herein refers to crude oil usually consisting of a variety of light and intermediate hydrocarbons, such as paraffins and aromatic hydrocarbons, wax paraffins and a variety of other heavy organic compounds, such as resins and asphaltenes.

Aromatic Compound

At least one aromatic compound or a mixture of aromatic compounds may be used for the alkylation reaction in accordance with the present invention. In one embodiment, the at least one aromatic compound or the aromatic compound mixture comprises at least one of monocyclic aromatics, such as benzene, toluene, xylene, cumene or mixtures thereof. The at least one aromatic compound or aromatic compound mixture may also comprise bi-cyclic and poly-cyclic aromatic compounds, such as naphthalenes. In one preferred embodiment, the at least one aromatic compound or aromatic compound mixture is xylene, including all isomers (i.e., meta-, ortho- and para-), a raffinate of xylene isomerization, and mixtures thereof. Most preferably, the at least one aromatic compound is ortho-xylene.

Sources of Aromatic Compound

The at least one aromatic compound or the mixture of aromatic compounds employed in the present invention is prepared by methods that are well known in the art.

Olefins

Sources of Olefins

The olefins employed in this Invention may be linear, isomerized linear, branched or partially branched linear. The olefin may be a mixture of linear olefins, a mixture of isomerized linear olefins, a mixture of branched olefins, a mixture of partially branched linear or a mixture of any of the foregoing.

The olefins may be derived from a variety of sources. Such sources include the normal alpha olefins, linear alpha olefins, isomerized linear alpha olefins, dimerized and oligomerized olefins, and olefins derived from olefin metathesis. Another source from which the olefins may be derived is through cracking of petroleum or Fischer-Tropsch wax. The Fischer-Tropsch wax may be hydrotreated prior to cracking. Other commercial sources include olefins derived from paraffin dehydrogenation and oligomerization of ethylene and other olefins, methanol-to-olefin processes (methanol cracker) and the like.

The olefins may also be substituted with other functional groups, such as carboxylic acid groups, heteroatoms, and the like, provided that such groups do not react with the strong acid catalyst.

The mixture of olefins is selected from olefins with carbon numbers ranging from about 8 carbon atoms to about 100 carbon atoms. In one embodiment, the mixture of olefins is selected from olefins with carbon numbers ranging from about 10 to about 80 carbon atoms. In one embodiment, the mixture of olefins is selected from olefins with carbon numbers ranging from about 10 to about 58 carbon atoms. In one embodiment, the mixture of olefins is selected from olefins with carbon numbers ranging from about 10 to about 40 carbon atoms.

In another embodiment, the mixture of olefins is selected from linear alpha olefins or isomerized olefins containing from about 8 to about 100 carbon atoms. In another embodiment, the mixture of olefins is selected from linear alpha olefins or isomerized olefins containing from about 10 to about 80 carbon atoms. In another embodiment, the mixture of olefins is selected from linear alpha olefins or isomerized olefins containing from about 10 to about 58 carbon atoms. In one embodiment, the mixture of olefins is selected from olefins with carbon numbers ranging from about 10 to about 40 carbon atoms.

The mixture of olefins for use herein contains a distribution of carbon atoms that comprise from greater than 15 weight percent to about 23 weight percent $C_{30}$ to $C_{58}$. In one embodiment, the mixture of olefins for use herein contains a distribution of carbon atoms that comprise from about 45 weight percent to about 75 weight percent of about $C_{12}$ to about $C_{20}$. In one embodiment, the mixture of olefins for use herein contains a distribution of carbon atoms that comprise from about 55 weight percent to about 75 weight percent of about $C_{12}$ to about $C_{20}$. In one embodiment, the mixture of olefins for use herein contains a distribution of carbon atoms that comprise from about 45 weight percent to about 75 weight percent of about $C_{12}$ to about $C_{20}$ and from greater than 15 weight percent and up to about 23 weight percent $C_{30}$ to $C_{58}$. In one embodiment, the mixture of olefins for use herein contains a distribution of carbon atoms that comprise from about 55 weight percent to about 75 weight percent of about $C_{12}$ to about $C_{20}$ and from greater than 15 weight percent and up to about 23 weight percent $C_{30}$ to $C_{58}$.

Normal Alpha Olefins

In one embodiment, the mixture of linear olefins that may be used for the alkylation reaction is a mixture of normal alpha olefins selected from olefins having from about 8 to about 100 carbon atoms per molecule. In one embodiment, the normal alpha olefin mixture is selected from olefins having from about 10 to about 80 carbon atoms per molecule. In one embodiment, the normal alpha olefin mixture is selected from olefins having from about 10 to about 58 carbon atoms per molecule. In one embodiment, the normal alpha olefin mixture is selected from olefins having from about 10 to about 40 carbon atoms per molecule.

In one embodiment of the present invention, the normal alpha olefins are isomerized using at least one of two types of acidic catalysts, solid or liquid. A solid catalyst preferably has at least one metal oxide and an average pore size of less than 5.5 angstroms. More preferably, the solid catalyst is a molecular sieve with a one-dimensional pore system, such as SM-3, MAPO-11, SAPO-11, SSZ-32, ZSM-23, MAPO-39, SAPO-39, ZSM-22 or SSZ-20. Other possible acidic solid catalysts useful for isomerization include ZSM-35, SUZ-4, NU-23, NU-87 and natural or synthetic ferrierites. These molecular sieves are well known in the art and are discussed in Rosemarie Szostak's Handbook of Molecular Sieves (New York, Van Nostrand Reinhold, 1992) which is herein incorporated by reference for all purposes. A liquid type of isomerization catalyst that can be used is iron pentacarbonyl ($Fe(CO)_5$).

The process for isomerization of normal alpha olefins may be carried out in batch or continuous mode. The process temperatures may range from about 50° C. to about 250° C. In the batch mode, a typical method used is a stirred autoclave or glass flask, which may be heated to the desired reaction temperature. A continuous process is most efficiently carried out in a fixed bed process. Space rates in a fixed bed process can range from 0.1 to 10 or more weight hourly space velocity.

In a fixed bed process, the isomerization catalyst is charged to the reactor and activated or dried at a temperature of at least 150° C. under vacuum or flowing inert, dry gas. After activation, the temperature of the isomerization catalyst is adjusted to the desired reaction temperature and a flow of the olefin is introduced into the reactor. The reactor effluent containing the partially-branched, isomerized olefins is collected. The resulting partially-branched, isomerized olefins contain a different olefin distribution (i.e., alpha olefin, beta olefin; internal olefin, tri-substituted olefin, and vinylidene olefin) and branching content that the unisomerized olefin and conditions are selected in order to obtain the desired olefin distribution and the degree of branching.

Process for Preparing Alkylated Aromatic Compound

In one embodiment of the present invention, the alkylation process is carried out by charging a hydrocarbon feed comprising an aromatic compound or a mixture of aromatic compounds, a mixture of olefin compounds and a catalyst such as a strong acid catalyst or acidic ionic liquid catalyst to a reaction zone in which agitation is maintained. The resulting mixture is held in the alkylation zone under alkylation conditions for a time sufficient to allow substantial conversion (i.e., at least 80 mole % of the olefin has reacted) of the olefin to aromatic alkylate. After desired time, the reaction mixture is removed from the alkylation zone and fed to a liquid-liquid separator to allow hydrocarbon products to separate from the acidic ionic liquid catalyst. In the case of certain catalysts, the catalyst is recycled to the reactor in a closed loop cycle. The hydrocarbon product is further treated to remove excess un-reacted aromatic compounds and optionally olefinic compounds from the desired alkylate product. The excess aromatic compounds are also recycled to the reactor.

Many types of reactor configurations may be used for the reactor zone. These include, but are not limited to, batch and continuous stirred tank reactors, reactor riser configurations, ebulating bed reactors, and other reactor configurations that, are well known in the art. Many such reactors are known to those skilled in the art and are suitable for the alkylation reaction. Agitation is critical for the alkylation reaction and can be provided by rotating impellers, with or without baffles, static mixers, kinetic mixing in risers, or any other agitation devices that are well known in the art.

The alkylation process may be carried out at temperatures from about 0° C. to about 100° C. The process is earned out under sufficient pressure that a substantial portion of the feed components remain in the liquid phase. Typically, a pressure of 0 to 150 psig is satisfactory to maintain feed and products in the liquid phase.

The residence time in the reactor is a time that is sufficient to convert a substantial portion of the olefin to alkylate product. The time required is from about 30 seconds to about 30 minutes. A more precise residence time may be determined by those skilled in the art using batch stirred tank reactors to measure the kinetics of the alkylation process.

The at least one aromatic compound or mixture of aromatic compounds and the mixture of olefins may be injected separately into the reaction zone or may be mixed prior to injection. Both single and multiple reaction zones may be used with the injection of the aromatic compounds and the mixture of olefins into one, several, or all reaction zones. The reaction zones need not be maintained at the same process conditions.

The hydrocarbon feed for the alkylation process may comprise a mixture of aromatic compounds and a mixture olefins in which the molar ratio of aromatic compounds to olefins is from about 0.5:1 to about 50:1 or more. In the case where the molar ratio of aromatic compounds to olefin is >1.0, there is an excess amount of aromatic compounds present. Preferably an excess of aromatic compounds is used to increase reaction rate and improve product selectivity. When excess aromatic compounds are used, the excess un-reacted aromatic in the reactor effluent can be separated, e.g. by distillation, and recycled to the reactor.

One embodiment of the present invention is a continuous process with closed loop catalyst recycle. A hydrocarbon feed comprising aromatic compound(s) or a mixture of aromatic compounds and a mixture of olefin(s) is charged continuously and pumped to a reactor. Alternatively, the aromatic compound(s) and mixture of olefin(s) may be charged by separate lines and pumps to another line. At the beginning of the process fresh catalyst is charged and pumped 20 to a reactor. The hydrocarbon feed and catalyst are maintained in a reactor with agitation under alkylation process conditions for a sufficient time in order for a substantial amount of the mixture of olefins in the feed charge to react and form an aromatic alkylate compound. Pressure in the reactor is maintained by a backpressure valve. The effluent from the reactor is passed through the backpressure valve to a separator via a line. In the separator, the immiscible hydrocarbon and catalyst separate into two phases. For example, as an acidic ionic liquid catalyst is more dense than the hydrocarbon phase, the acidic ionic liquid catalyst settles to the bottom of the separator. When a sufficient volume of acidic ionic liquid catalyst is available to fill a line and the bottom of the separator, the flow of fresh catalyst via a line is stopped and "used" or "recycled" catalyst is returned to the reactor from the separator via a line. The major portion of this process is thus operated under conditions of catalyst recycle, under which no fresh catalyst is added or only a small amount of make-up catalyst is added. The hydrocarbon product stream containing the aromatic alkylate compound and excess un-reacted aromatic is charged to a product separation section via a line. In product separation, excess aromatic compounds are distilled off and returned to the reactor, leaving an alkylated aromatic compound.

Acidic Alkylation Catalyst

The alkylaromatic compound may be prepared using an acidic alkylation catalyst. In one embodiment, the acidic alkylation catalyst is a strong acid catalyst such as a Bronsted or a Lewis acid. Useful strong acid catalysts includes, by way of example, hydrochloric acid, hydrofluoric acid, hydrobromic acid, sulfuric acid, perchloric acid, trifluoromethane sulfonic acid, fluorosulfonic acid, Amberlyst® 36 sulfonic acid, which may be purchased from Rohm and Haas, nitric acid, aluminium trichloride, aluminium tribromide, boron trifluoride, antimony pentachloride, and the like and mixtures thereof. The alkylation process may be carried out in a batch or continuous process. The strong acid catalyst may be recycled, or regenerated when used in a batch process or a continuous process.

The strong acid catalyst may be regenerated after it becomes deactivated (i.e., the catalyst has lost all or some portion of its catalytic activity). Methods that are well known in the art may be used to regenerate the deactivated strong acid catalyst.

In another embodiment, the acidic alkylation catalyst is an acidic ionic liquid catalyst. An acidic ionic liquid catalyst is composed of two components which form a complex. The first component of the catalyst will typically comprise a compound selected from the group consisting of aluminum halide, alkyl aluminum halide, gallium halide, and alkyl gallium halide. Especially preferred for the first component is aluminum, halide or alkyl aluminum halide. In particular, aluminum trichloride may be used as the first component for preparing the catalyst used in practicing the present invention.

The second component making up the ionic liquid catalyst is an organic salt or mixture of salts. These salts may be characterized by the general formula $Q^+A^-$, wherein $Q^+$ is an ammonium, phosphonium, or sulfonium cation and $A^-$ is a negatively charged ion such as $Cl^-$, $Br^-$, $ClO_4^-$, $NO_3^-$, $BF_4^-$, $BCL_4^-$, $PF_6^-$, $SbF_6^-$ $AlCl_4^-$, $ArF_6^-$, $TaF_6^-$, $CuCl_2^-$, $FeCl_3^-$, $SO_3CF_3^-$, $SO_3C_7^-$, and 3-sulfurtrioxyphenyl. Preferred for use as the second component are those quaternary ammonium halides containing one or more alkyl moieties having from about 1 to about 9 carbon atoms, such as, for example, trimethylamine hydrochloride, methyltributylammonium, and 1-butylpyridinium, or hydrocarbyl substituted imidazolium halides, such as for example, 1-ethyl-3-methyl-imidazolium chloride.

The presence of the first component should give the ionic liquid a Lewis acidic character. Generally, the greater the mole ratio of the first component to the second component, the greater the acidity of the ionic liquid mixture. When aluminum trichloride and trimethylamine hydrochloride are used as the first and second components, respectively, of the acidic ionic liquid catalyst, they preferably will be present in a mole ratio of from greater than about 1:1 to about 2:1.

The alkylation process may be carried out in a batch or continuous process. The acidic ionic liquid catalyst may be recycled when used in a continuous process or batch process.

Alkylated Aromatic Compound

The resulting product is an alkylaromatic compound wherein the alkyl group contains a distribution of alkyl chain lengths which comprise greater than 15 weight percent and up to about 35 weight percent of $C_{30}$ to $C_{58}$. In embodiment, the alkyl group contains a distribution of carbon atoms that comprise from about 45 weight percent to about 75 weight percent of about $C_{12}$ to about $C_{20}$ and from greater than 15 weight percent and up to about 35 weight percent $C_{30}$ to $C_{58}$. In one embodiment, the resulting product is an alkylaromatic compound wherein the alkyl group contains a distribution of alkyl chain lengths which comprise greater than 16 weight percent and up to about 35 weight percent of $C_{30}$ to $Q_{58}$. In embodiment, the alkyl group contains a distribution of carbon atoms that comprise from about 45 weight percent to about 75 weight percent of about $C_{12}$ to about $C_{20}$ and from greater than 16 weight percent and up to about 35 weight percent $C_{30}$ to $C_{58}$. It is believed that the weight percent of $C_{30}$-$C_{58}$ alkylate species in the alkylaromatic is also present in the resulting alkylaromatic sulfonate discussed below.

Procedure for Sulfonation of Alkylaromatics

Sulfonation of the alkylaromatic, such as alkylorthoxylene, may then be performed in a manner by any method known to one of ordinary skill in the art. The sulfonation reaction is typically carried out in a falling film tubular reactor maintained at about 35° C. In one embodiment, the alkylaromatic is placed in the reactor tube along with sulfur trioxide diluted with air. The molar ratio of alkylaromatic to sulfur trioxide is maintained at about 1.05:1.

Procedure for Digestion of Alkylaromatic Sulfonic Acids

Digestion of alkylaromatic sulfonic acids such as alkylxylene sulfonic acids may be carried out in a continuous or batch process by any method known to a person skilled in the art to produce alkylaromatic sulfonic acids. Generally the digestion is carried out from about 20 minutes to about 80 minutes at a temperature ordinarily ranging from about 70° C. to about 95° C.

Procedure for Neutralization of Alkylaromatic Sulfonic Acids

Neutralization of alkylaromatic sulfonic acids such as alkylxylene sulfonic acids may be carried out in a continuous or batch process by any method known to a person skilled in the art to produce such alkylaromatic sulfonates.

Generally, the neutralization reaction is carried out in an in-line mixing reactor in which the alkylaromatic sulfonic acid and an organic or inorganic base are mixed and the temperature is maintained between about 20° C. and about 80° C. The amount of alkali metal used is based on the acid number determined for each alkylaromatic sulfonic acid.

In one embodiment, the resulting product is an alkylaromatic sulfonate compound is an alkylxylene sulfonate represented by the following structure:

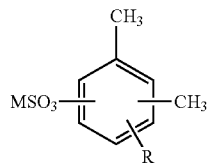

wherein R is an alkyl group containing from about 10 to about 58 carbon atoms, M is a mono-valent cation, and wherein the alkyl group contains a distribution of alkyl chain lengths wherein the alkyl chain lengths comprise from greater than 15 weight percent and up to about 35 weight percent of $C_{30}$ to $C_{58}$. In one embodiment, the alkyl group of the alkylxylene sulfonate contains a distribution of alkyl chain lengths wherein the alkyl chain lengths comprise from greater than 16 weight percent and up to about 35 weight percent of $C_{30}$ to $C_{58}$. The mono-valent cation in the alkylxylene sulfonate is an alkali metal. In one preferred embodiment, the alkali metal is sodium. The mono-valent cation may be an ammonium ion or an organic ammonium ion.

The alkylaromatic sulfonate of the present invention is advantageously employed in a method for recovering crude oil from a subterranean hydrocarbon containing formation. In general the method involves: (a) injecting into the formation an aqueous solution containing an amount of one or more alkylaromatic sulfonates or a mixture of alkylaromatic sulfonates effective for the recovery of crude oil wherein the alkyl group of the alkylaromatic sulfonate contains a distribution of alkyl chain lengths which comprise greater than 15 weight percent up to about 35 weight percent of $C_{30}$ to $C_{58}$; and (b) displacing the crude oil with the aqueous solution injected into the formation to thereby recover hydrocarbons from a production well. In general, the optimum salinity of the alkylxylene sulfonate is in the range of about 0.3 to about 0.8 weight percent sodium chloride.

In step (a) in the above method, the alkylaromatic sulfonate is present in an amount ranging from about 0.03 weight percent to about 3.0 weight percent, based on the total weight of the aqueous solution. In another embodiment, the alkylaromatic sulfonate is present in an amount ranging front about 0.1 weight percent to about 1.5 weight percent, based on the total weight of the aqueous composition. In another embodiment, the alkylaromatic sulfonate is present in an amount ranging from about 0.3 weight percent to about 1.0 weight percent, based on the total weight of the aqueous composition. In another embodiment, the alkylaromatic sulfonate is present in an amount ranging from about 0.5 weight percent to about 0.8 weight percent of the total weight of the aqueous composition.

In addition to the use of an aqueous solution containing the alkylaromatic sulfonate of the present method for enhancing the recovery of crude oil, an amount of a polymer may also be injected, concurrently with or subsequent to the injection of the aqueous solution, effective for driving the aqueous solution of the alkylaromatic sulfonate into the formation to displace the crude oil into the formation to recover hydrocarbons from a production well.

The injection of the polymer may be followed by an injection of an amount of water effective for driving the polymer into the formation to recover hydrocarbons from a production well. Alternately, the injection of an amount of water effective for driving the alkylaromatic sulfonate of the present invention into the formation to recover hydrocarbons from a production well may be performed without the prior injection of the polymer. Another alternative involves the use of water along with the polymer for driving the alkylaromatic sulfonate of the present invention into the formation to recover hydrocarbons from a production well.

In the above method, the hydrocarbon in the subterranean formation may be a waxy crude oil.

Any suitable co-solvents may optionally be used with the alkylaromatic sulfonate of the present invention. Representative examples of suitable co-solvents include alcohols, alcohol ethers, polyalkylene glycols, poly(oxyalkylene)glycols and poly(oxyalkylene)glycol ethers may optionally be used along with the alkylxylene sulfonate of this invention for surfactant flooding.

Any suitable co-surfactants may also optionally be used with the alkylaromatic sulfonate of the present invention. Representative, examples of suitable co-surfactants include other alkylaromatic sulfonates and/or olefin sulfonates.

The following non-limiting examples are illustrative of the present invention.

EXAMPLE 1

Procedure for Determining the ≥C30 Alkylate Content by Supercritical Fluid Chromatography (SFC).

A SENSAR Larson-Davis Model 3000 Supercritical Fluid Chromatograph (SFC) equipped with a 10 meter×95 micron OD/50 micron ID, 0.25 micron SB-Methyl 100 film capillary column, an FID detector operating at 325° C. and carbon dioxide eluent was used with time-split injection. The following pressure ramp program was used (isothermal oven temperature 100° C.):

Initial Pressure=100 atm
Inject Sample (0.2 seconds)
Hold five minutes
Ramp to 400 atm at 10 atm/min
Hold 5 minutes Under the above SFC chromatograph conditions, the total $C_{12}$ to $C_{30+}$ o-xylene alkylate species elute between about 12 minutes and 35 minutes. The ≥C30 alkylate species elute between 20.4 and 35 minutes.

The weight percent $C_{30}$–$C_{58}$ alkylate species from the integration of the SFC chromatograms is calculated as follows:

Weight Percent $C_{30}$–$C_{58}$ Alkylate Species=(Peak Area between 20.4 and 35 minutes/Peak Area between 12 and 35 minutes)×100

EXAMPLE 2

Preparation of $C_{12}$-$C_{30+}$ Alkyl o-Xylene Alkylate Sample 1.

The $C_{12}$-$C_{30+}$ alkyl o-xylene alkylate sample 1 was prepared on a commercial scale by a third party by alkylating o-xylene with a $C_{12}$-$C_{30+}$ normal alpha olefin blend containing 4.5 weight percent $C_{30+}$ NAO fraction and aluminium trichloride catalyst. The amount of ≥$C_{30+}$ alkylate content of this sample was 15.6 weight percent as determined by SFC according to Example 1.

Example 3

Preparation of $C_{12}$-$C_{30+}$ Alkyl o-Xylene Alkylate Samples 2-6.

The following general procedure was followed to prepare $C_{12}$-$C_{30+}$ alkyl o-xylene alkylate samples 2-6.

Approximately 1000 grams of o-xylene (Reagent Grade) in a 3 liter glass reactor fitted with a mechanical stirrer, thermometer, an ice-water cooling bath on a jack stand and a 1 liter addition funnel was cooled to between 20 and 26° C. To the reactor was then added solid aluminium trichloride (Reagen Grade) equal to approximately 4.0 weight percent of the $C_{12}$-$C_{30+}$ normal alpha olefin blend to be used for each preparation followed by approximately 0.5 grams of deionized water with stirring. To the reactor was then added a mixture of $C_{12}$-$C_{30+}$ normal alpha olefin blend, as defined in the following table, mixed with approximately 120 grams of o-xylene over approximately 1 hour while maintaining the reaction contents between 30 and 35° C. by adjusting the level of the cooling bath. The contents of the reactor were held at between 30 to 35° C. with, agitation for another approximately 1.5 hours and then the contents of the reactor were poured into three 2 liter beakers filled with ice.

The contents of the beaker were agitated with manual stirring with a stirring rod and then sufficient aqueous NaOH (50 baume) was poured into each beaker in 20-30 ml portions with stirring until the pH of the liquid phase in the beakers was approximately pH=10-11). The beakers were allowed to stand at room temperature until all the ice was melted and then transferred to separatory funnels and extracted with water until the water washings were neutral (pH=7). The organic layer was then dried over anhydrous $MgSO_4$, filtered and the excess o-xylene was removed by vacuum distillation (rotoevaporation at approximately 90° C. and 10 mm Hg vacuum). The resulting alkylate product was analyzed by SFC as described in Example 1.

The following Table 1 is the blend of $C_{12}$-$C_{30+}$ NAO fractions. When the $C_{30+}$ fraction is increased, the amount of the other NAO fractions is decreased proportionately.

TABLE 1

| NAO Fraction | Weight % In NAO Blend |
|---|---|
| C12 | 3.9 |
| C14 | 23.3 |
| C16 | 18.2 |
| C18 | 13.8 |
| C20 | 8.8 |
| C22 | 7.5 |
| C24 | 5.8 |
| C26 | 3.4 |
| C28 | 3.5 |
| C30+ | 11.8 |

The amount of ≥$C_{30}$ alkylate species produced in the alkylation reactions of Example 3 is not only a function of the amount of $C_{30}$ NAO fraction utilized but varies from reaction to reaction. The amount of $C_{30+}$ alkylate species produced in the alkylation reactions of Example 3 is set forth below in Table 2.

TABLE 2

| Alkylate Sample | Amount of $C_{12}$-$C_{30+}$ NAO Blend (gm) | % Weight $C_{30+}$ Fraction in NAO Blend | Weight Percent ≥ $C_{30}$-$C_{58}$ Alkylate Species by SFC |
|---|---|---|---|
| 2 | 562.5 | 9.9 | 16.5 |
| 3 | 560.2 | 8.5 | 20.4 |
| 4 | 561.4 | 11.2 | 23.8 |
| 5 | 588.5 | 16.0 | 25.7 |
| 6 | 588.2 | 16.0 | 29.4 |

EXAMPLE 4

Preparation of Sodium Sulfonate from $C_{12}$-$C_{30+}$ Alkyl o-Xylene Alkylate Samples 1-6.

The $C_{12}$-$C_{30+}$ alkyl o-xylene alkylate samples were first sulfonated in a glass, water jacketed, falling film tubular reactor (0.6 cm ID and three reactors in series, R1=30 cm, R2=30 cm and R3=70 cm) using $SO_3$/Air and the following general conditions:

Alkylate Feed Temperature=50° C.,
Reactor Temperature=55° C.,
Air Flow=192 liters/hr,
$SO_2$ Flow=16 liters/hr,
$SO_2$ to $SO_3$ conversion=87%,
Alkylate Feed Rate was adjusted to maintain the $SO_3$/Alkylate charge molar ratio equal to 1.0 (typically about 4.0 gms/minute).

The resulting crude $C_{12}$-$C_{30+}$ alkyl o-xylene sulfonic acids were digested at 70° C. for approximately 20 minutes and then neutralized to approximately pH 9-11 (as about 1 weight percent aqueous solutions) with aqueous sodium hydroxide (50 Baume) with mechanical stirring to afford the final sodium $C_{12}$-$C_{30+}$ alkyl o-xylene sulfonate. It is believed that the weight percent of $C_{30}$-$C_{58}$ alkylate species in the alkyl o-xylene is also present in the resulting sodium $C_{12}$-$C_{30+}$ alkyl o-xylene sulfonate.

EXAMPLE 5

Phase Behavior Testing of the Sodium Sulfonates from the $C_{12}$-$C_{30+}$ Alkyl o-Xylene Alkylate Samples 1-6.

The experimental procedure is described in the Masters Thesis by Adam Christopher Jackson, University of Austin at Austin, Tex., December, 2006, "Experimental Study of the Benefits of Sodium Carbonate on Surfactants for Enhanced Oil Recovery", the contents of which are incorporated by reference. The formulation tested was composed of 2.0 weight percent surfactant (1.5 weight percent of the sodium $C_{12}$-$C_{30+}$ o-xylene sulfonate and 0.5 weight percent of a secondary surfactant—an isomerized alpha olefin sulfonate derived from an isomerized $C_{20}$ to $C_{24}$ linear olefin), 3 weight percent ethylene glycol butyl ether (EGBE) co-solvent, 0.1 to 0.2 weight percent polymer ("Flopam AN 125 available from SNF Floerger Company) and added sodium carbonate at different, amounts to effect a salinity gradient for the phase behavior experiments in to effect a mixed in softened synthetic Minas brine (SSMB) and water. The SSMB is a softened synthetic brine that is a low salinity softened brine containing no di-valent ions and a Total Dissolved Solids (TDS) content of about 2800 mg/l.

Table 3 below summarizes oil solubilization parameters observed for the sodium sulfonates made from the $C_{12}$-$C_{30+}$ o-xylene alkylate samples 1-6 and the Weight Percent of $C_{30}$-$C_{58}$ Alkylate Species determined by SFC.

TABLE 3

| $C_{12}$-$C_{30+}$ o-Xylene Alkylate used to prepare the corresponding sodium $C_{12}$-$C_{30+}$ o-xylene Sulfonate | Weight Percent of $C_{30}$-$C_{58}$ Alkylate Species by SFC | Oil Solubilization Parameter obtained from the Phase Behavior Experiments (SP) |
|---|---|---|
| 1 | 15.6 | 4 |
| 2 | 16.5 | 7.5 |
| 3 | 20.4 | 7 |
| 4 | 23.8 | 8 |
| 5 | 25.7 | 8 |
| 6 | 29.4 | 9 |

These results show the surprising result that as the amount of weight percent of $C_{30}$-$C_{58}$ alkylate species increases, the oil solubilization factor increases.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the claims appended hereto.

What is claimed is:

1. An alkylaromatic sulfonate wherein the alkyl group contains a distribution of alkyl chain lengths which comprise from 16.5 weight percent and up to about 35 weight percent of $C_{30}$ to $C_{58}$.

2. The alkylaromatic sulfonate of claim 1, wherein the at least one aromatic compound is selected from the group consisting of unsubstituted aromatic compounds, monosubstituted aromatic compounds, and disubstituted aromatic compounds.

3. The alkylaromatic sulfonate of claim 2, wherein the unsubstituted aromatic compounds, monosubstituted aromatic compounds, and disubstituted aromatic compounds are selected from the group consisting of benzene, toluene, meta-ylene, para-xylene, ortho-xylene, and mixtures thereof.

4. The alkylaromatic sulfonate of claim 1, wherein the alkyl group is derived from a mixture of linear alpha olefins or isomerized olefins containing from about 10 to about 58 carbon atoms.

5. The alkylaromatic sulfonate of claim 1, wherein the alkyl chain lengths comprise from about 45 weight percent to about 75 weight percent of $C_{12}$ to $C_{20}$ and from 16.5 weight percent and up to about 35 weight percent of $C_{30}$ to $C_{58}$.

6. The alkylaromatic sulfonate of claim 1, which is an alkylxylene sulfonate represented by the following formula:

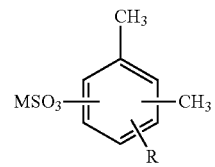

wherein R is an alkyl group containing from about 10 to about 58 carbon atoms, M is a mono-valent cation, and wherein the alkyl group contains a distribution of alkyl chain lengths wherein the alkyl chain lengths comprise from 16.5 weight percent and up to about 35 weight percent of $C_{30}$ to $C_{58}$.

7. The alkylaromatic sulfonate of claim 6, wherein the mono-valent cation is an alkali metal.

8. The alkylaromatic sulfonate of claim 6, wherein the mono-valent cation is sodium.

9. The alkylaromatic sulfonate of claim 6, wherein the alkylxylene sulfonate has an optimum salinity in the range of about 0.3 to 0.8 weight percent sodium chloride.

10. A process for preparing an alkylaromatic sulfonate, the process Comprising:
   (a) reacting at least one aromatic compound with a mixture of olefins selected from olefins having from about 8 to about 100 carbon atoms, wherein the mixture of olefins contains a distribution of carbon atoms that comprise from greater than 15 weight percent and up to about 23 weight percent $C_{30}$ to $C_{58}$, in the presence of an acidic alkylation catalyst;
   (b) sulfonating the product of step (a); and
   (c) neutralizing the sulfonated product of step (b) with an alkali or alkaline earth metal hydroxide; wherein the resulting alkylaromatic sulfonate possesses an alkyl group containing a distribution of alkyl chain lengths which comprise from 16.5 weight percent and up to about 35 weight percent of $C_{30}$ to $C_{58}$.

11. The process of claim 10, wherein the aromatic compound is selected from the group consisting of benzene, toluene, meta-ylene, para-xylene, ortho-xylene, and mixtures thereof.

12. The process of claim 10, wherein the mixture of olefins is a mixture of linear olefins, a mixture of linear isomerized olefins, a mixture of branched olefins, a mixture of partially branched olefins or a mixture thereof.

13. The process of claim 12, wherein the mixture of linear olefins is a mixture of normal alpha olefins containing from about 10 to about 58 carbon atoms.

14. The process of claim 10, wherein the step of sulfonating comprises reacting the product of step (a) with sulfur trioxide, which has been diluted with air.

15. A method for recovering crude oil from a subterranean hydrocarbon containing formation, the method comprising:
(a) injecting into the formation an aqueous solution containing an amount of one or more alkylaromatic sulfonates or a mixture of alkylaromatic sulfonates effective for the recovery of crude oil wherein the alkyl group of alkylaromatic sulfonate contains a distribution of alkyl chain lengths which comprise from 16.5 weight percent up to about 35 weight percent of $C_{30}$ to $C_{58}$; and
(b) displacing the crude oil with the aqueous solution injected into the formation to thereby recover hydrocarbons from a production well.

16. The method of claim 15, wherein in step (a) the alkylaromatic sulfonate is present in an amount of about 0.03 weight percent to about 3.0 weight percent, based on the total weight of the aqueous solution.

17. The method of claim 15, wherein the alkylaromatic sulfonate is an alkylxylene sulfonate represented by the following formula:

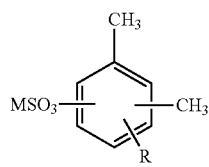

wherein R is an alkyl group containing from about 10 to about 58 carbon atoms, M is a mono-valent cation, and wherein the alkyl group contains a distribution of alkyl chain lengths wherein the alkyl chain lengths comprise from from 16.5 weight percent and up to about 35 weight percent of $C_{30}$ to $C_{58}$.

18. The method of claim 15, wherein the aqueous solution in step (a) further contains a co-solvent or a co-surfactant.

19. The method of claim 15, wherein the hydrocarbon in the subterranean formation is a waxy crude oil.

20. The method of claim 15, further comprising, concurrently with or subsequent to the injection of the aqueous solution in step (a), injecting into the formation an amount of water effective for driving the aqueous solution of step (a) into the formation to displace the crude oil to thereby recover hydrocarbons from a production well.

21. The method of claim 15, further comprising, concurrently with or subsequent to the injection of the aqueous solution in step (a), injecting into the formation an amount of a polymer effective for driving the aqueous solution of step (a) into the formation to displace the crude oil to thereby recover hydrocarbons from a production well.

22. The method of claim 21, wherein the polymer is a polysaccharide, an acrylamide or a partially hydrolyzed polyacrylamide.

23. The method of claim 15, further comprising, concurrently with or subsequent to the injection of the or the polymer, injecting into the formation an amount of water effective for driving the aqueous solution of step (a) into the formation to displace the crude oil to thereby recover hydrocarbons from a production well.

24. The alkylaromatic sulfonate of claim 1, wherein the alkyl group contains a distribution of alkyl chain lengths which comprise from 20.4 weight percent and up to about 35 weight percent of $C30$ to $C_{58}$.

25. The alkylaromatic sulfonate of claim 6, wherein the alkyl group contains a distribution of alkyl chain lengths wherein the alkyl chain lengths comprise from 20.4 weight percent and up to about 35 weight percent of $C_{30}$ to $C_{58}$.

26. The process of claim 10, wherein the resulting alkylaromatic sulfonate possesses an alkyl group containing a distribution of alkyl chain lengths which comprise from 20.4 weight percent and up to about 35 weight percent of $C_{30}$ to $C_{58}$.

* * * * *